(12) United States Patent
Bishop et al.

(10) Patent No.: US 7,572,083 B1
(45) Date of Patent: Aug. 11, 2009

(54) FLOATING BREAKWATER SYSTEM AND METHOD FOR DISSIPATING WAVE ENERGY

(75) Inventors: Robert Bishop, West Caldwell, NJ (US); Justin Bishop, West Caldwell, NJ (US)

(73) Assignee: Elemental Innovation Inc., West Caldwell, NJ (US)

( * ) Notice: Subject to any disclaimer, the term of this patent is extended or adjusted under 35 U.S.C. 154(b) by 1497 days.

(21) Appl. No.: 09/669,655

(22) Filed: Sep. 26, 2000

(51) Int. Cl.
*E02B 3/04* (2006.01)

(52) U.S. Cl. ............................. 405/26; 405/21; 405/25; 405/28; 405/33

(58) Field of Classification Search ................. 405/21, 405/22, 23, 25, 26, 28, 30, 33, 34, 35; 114/267, 114/294; 441/1, 35, 133
See application file for complete search history.

(56) References Cited

U.S. PATENT DOCUMENTS

| | | | |
|---|---|---|---|
| 905,596 A | 12/1908 | Smith | |
| 3,210,944 A * | 10/1965 | Svee | 405/33 |
| 3,733,831 A * | 5/1973 | Stick, Jr. | 405/30 |
| 3,896,624 A * | 7/1975 | Chang | 405/29 |
| 3,958,426 A * | 5/1976 | Heien | 405/23 |
| 4,136,994 A * | 1/1979 | Fuller | 405/27 |
| 4,231,680 A * | 11/1980 | Ijima | 405/31 |
| 4,279,536 A * | 7/1981 | Jarlan | 405/31 |
| 4,367,978 A * | 1/1983 | Schaaf et al. | 405/30 |
| 4,431,337 A * | 2/1984 | Iwasa | 405/30 |
| 4,498,805 A * | 2/1985 | Weir | 405/31 |
| 4,708,521 A * | 11/1987 | Kocourek | 405/31 |
| 4,711,598 A * | 12/1987 | Schaaf et al. | 405/30 |
| 4,824,286 A | 4/1989 | Wass | |
| 5,123,221 A * | 6/1992 | Legault | 405/284 X |
| 5,123,780 A * | 6/1992 | Martinsen | 405/30 |
| 5,259,695 A * | 11/1993 | Mostkoff | 405/29 |
| 5,791,827 A * | 8/1998 | Arvai et al. | 405/31 X |
| 5,795,099 A | 8/1998 | Parker | |
| 5,827,011 A | 10/1998 | Kann | |
| 5,871,303 A | 2/1999 | Brown, III | |
| 5,879,105 A | 3/1999 | Bishop | |
| 6,305,877 B1 * | 10/2001 | Cavanagh | 405/26 |

FOREIGN PATENT DOCUMENTS

| | | | | |
|---|---|---|---|---|
| GB | 2183704 | * | 7/1987 | 405/16 |
| WO | 89/09308 | * | 10/1989 | 405/30 |

* cited by examiner

*Primary Examiner*—Jong-Suk (James) Lee
(74) *Attorney, Agent, or Firm*—Law Offices of Mitchell P. Novick; Benjamin Appelbaum (57) ABSTRACT

A floating breakwater system comprises a plurality of modules that are flexibly affixed together. The modules are affixed together to make up a plurality of vertical panels made up of the modules and the vertical panels themselves are flexibly affixed together in generally parallel relationship. Each individual module has a front face that faces the oncoming wave. There are at least two inlets in the front surface and corresponding outlets in the rear surface and passageways between the inlets and the outlets such that the water propelled by the wave passes through the at least two passageways. Each passageway is tapered inwardly in the direction of the flow of the water and each passageway has a main longitudinal axis. The respective axes are angled inwardly toward each other and converge at a point displaced rearwardly from the outlets so that the water that passes through the passageways intersect at the point and the energy of the wave is dissipated.

22 Claims, 9 Drawing Sheets

FLOATING BREAKWATER SYSTEM AND METHOD FOR DISSIPATING WAVE ENERGY

BACKGROUND OF THE INVENTION

The present invention relates to an apparatus and a system to carry out the dissipation of the energy of a wave or other like motion at the water and, in particular, to an apparatus and system that can be readily assembled and disassembled on site and which provides protection from the potentially damaging energy of the waves.

The destructive force at water can, of course, be damaging to structures, cause erosion of land and also damage to boats or other craft that are caused to move by the force of the water motion as it hits other boats or structures. The problem, therefore, is not limited to shore areas where the erosive effect is potentially damaging to the shore area but can be present in marinas, boat moorage areas or to any structure that abuts or is located in the near proximity to the water.

There are, of course, numerous types of apparatus that have been proposed and used for the protection of a shoreline against the continual erosion occasioned by the action of waves that strike the shore. Many have relied upon permanent structures that are installed on or near the shoreline and which are made of concrete, steel or of other heavy, stable materials. Examples of such permanent structures are shown and described in U.S. Pat. No. 4,711,598; U.S. Pat. No. 4,367,978 and U.S. Pat. No. 905,596 where the structures are constructed to be permanent as well as entrenched and affixed to the land.

While often effective, such permanent structures suffer from the lack of versatility, that is, they are permanent, and once constructed, cannot be moved to other locations where such protection is needed. In addition, there are many locations where permanent structures are simply not appropriate, such as within marinas, harbors or boat channels, where some means to alleviate the potential harm caused by the uncontrolled movement of the water against boats or docks is needed to counter the force of the wakes left by boats as well as the normal motion of the water.

Other means have also been proposed that are floating structures, including the use of hollow cylinders as shown in the Kann U.S. Pat. No. 5,827,011 as well as the use of a plurality of vehicle tires that form a carpet on the water as shown in Waas, U.S. Pat. No. 4,824,286. Another, more complex system is used to control erosion in U.S. Pat. No. 5,871,303 where an array of panel material are used to precipitate particles out of their suspension in the water and, again, the apparatus is anchored to the river or sea bed. Various barriers of a mesh material or use of ballasting blocks are also proposed and set forth in U.S. Pat. Nos. 5,795,099 and U.S. Pat. No. 4,279,536.

One energy dissipation system has also been disclosed in U.S. Pat. No. 5,879,105 by the present inventors and which consists of a plurality of buoyant modules that are affixed together such that the specially designed modules, working together, can disrupt the wave action in order to dissipate the energy of the wave motion. In that patent, however, the modules are designed to deflect the water motion around the modules in order to accomplish the effective dissipation of the wave energy and such apparatus has been proved to be very effective in affording protection against the destructive motion of the water.

SUMMARY OF THE INVENTION

The purpose of the present invention is to provide an apparatus and system that carries out effective dissipation of the energy of the wave or water motion and which system can be easily constructed in the ocean to alleviate the destructive nature of waves but can also, just as readily, be constructed and installed in a marina, harbor or other location where the movement of the water can be caused by the wake of a boat or normal water movement, including storms that may cause the water to rise to a destructive energy.

With the present invention, individual modules are provided that are easy and relatively inexpensive to produce and can be made of a plastic material such as polyethylene and molded into the particular desired configuration. A multiplicity of such modules are affixed together in a particular manner and configuration to form the overall floating breakwater system.

Such system comprises affixing the individual modules together in an aligned vertically disposed panel by means of elastic members such as rubber tubes, thus each vertical panel of modules has a certain flexibility and can flex during its dissipation of the wave or water surge energy. The vertical panels of modules are formed in multiples of such vertically disposed panels and the vertical panels are further joined together to additional similarly constructed vertical panels to create the overall floating breakwater system. Since the vertical panels are also joined together by elastic members, such as rubber tubes, the overall breakwater system can flex both in the vertical as well as horizontal directions, thus providing considerable overall give to the system when a wave or water surge is encountered.

In the present invention, unlike that of our prior system shown in U.S. Pat. No. 5,879,105, the modules are specially constructed to allow the water to pass through the individual modules, rather than around such modules, and that action, it is believed, enhances the ability of the present system to effectively dissipate the energy of the wave. In particular, with the present modules, each module has at least two passageways formed therein that allow the water to pass through the module. Each passageway has an inlet opening in the front surface of the module that faces the direction of the oncoming wave and an outlet opening in the opposite or rear surface of the module. Each passageway tapers inwardly in the direction of the wave motion, that is, the passageways each narrow in the direction from the front inlet to the rear outlet. As such, the water propelled by the wave passes through the module through the inwardly tapered passageways and the water is backed up and assists in dissipating the energy of the wave.

In addition, the passageways are angled inwardly toward each other in the direction from the front inlets to the rear outlets, that is, the longitudinal center lines of the passageways converge at an angle toward each other and eventually meet or cross at a point displaced rearwardly of the rear outlets. In the preferred embodiment, there are two passageways to carry out the afore described action, however, there may be three, four or even more passageways as long as those passageways taper inwardly in the direction of the moving water and also direct the moving water that passes through the passageways in each module to converge at a point displaced rearwardly from the rear outlets of the passageways.

Thus, in the overall floating breakwater system, where there are a plurality of vertical panels of modules elastically affixed together, after the water passes through one vertical panel of modules, it thereafter enters the modules in a subsequent vertical panel until the water has passed entirely through the breakwater system.

Accordingly, with the present invention, the apparatus can be used to dissipate the potentially destructive power from the wave action of the ocean or other body of water and can be specially adapted for use in a large number of differing locations where waves or wakes can be present.

As such, therefore, with the present invention, the floatable breakwater system can be set up and anchored to the floor of the body of water at a wide variety of locations and can just as easily be disassembled and moved to another location, a feature that is not possible to facilitate with permanent land based structures.

The anchoring of the present breakwater system to the floor of the body of water is carried out by the use of SEAFLEX® (registered trademark of Ancro Marin AB Corp., Umea, Sweden, for their brand of rope cable for use in mooring systems) cables that are particularly adapted to allow the movement of the system of floatable modules as the wave energy is dissipated while, at the same time, provide the necessary strength to insure a strong attachment to the floor of that body of water. The actual attachment of the breakwater to the bottom of the body of water is preferably carried out by means of helical anchors.

As will be seen, in normal operation, the floating breakwater system is maintained in a semi-submerged configuration, that is, about half of the modules are filled with water and about half are filled with air during its operation. The system itself is intended to be deployed or located parallel to the shoreline or anchorage. As a function or the overall design, it is advantageous to design and construct the width of the overall structure of the breakwater system in accordance with the water conditions. To that end, a ratio or ten to one is preferred for the structure width to the wavelength from the crest to crest (frequency) of the waves or water surges. For example, a one second frequency (time between crests) requires a ten foot width of the breakwater system whereas a two second frequency requires a twenty foot width and, extrapolating, a ten second wave requires a one hundred foot width of the breakwater system.

In the operation of the present breakwater system, the dissipation of the wave is accomplished by wave reflection, diffraction, wave canceling and water backup as well as the flexing of the structure system. Wave reflection and diffraction occur as the wave strikes the angled surfaces of the modules and spumes and flows of water are driven in various directions creating a maelstrom of activity. The process of reflection and diffraction is repeated as a wave attempts to pass through the entire breakwater system, that is, through each vertical panel made up of the plurality of modules.

The dissipation of the wave is also aided by vertical upwelling of the wave from beneath the structure. Waves that attempt to lift the structure strike a forty-five degree angled surface at the bottom of each module to create more spumes and vortices between the panels of the structures.

The technique of wave canceling is also used and is a new technique in the dissipation of wave energy. The technique is in allowing the water to pass through the modules and the water is separated into a plurality of streams that are basically directed upon themselves thereby eliminating the waves power. By the use of the two intersecting passageways in each module, the waves are bifurcated into two separate flows of water and those flows are directed at a nexus or converging point beyond the outlets in the modules. In addition the modules front surface inlets allow a portion of the water to be ingested into the modules. The inlets have volumetric ratio of three to one i.e. inlet to outlet and which provides the necessary water pressure allowing waves to cancel themselves out and to aid in a "water backup" effect.

The tapering of the passageways accomplish a water backup effect. Water, being an incompressible fluid enters the passageways in the modules and is squeezed due to the tapering configuration of the passageways thereby creating a cushion of water for the next wave to try and pass through.

The overall structure of the breakwater system has inherent flexibility and thus that structure flexes as the back up of water activates strut connectors between the vertical panels of modules. The flexibility of the strut connector allows a vertical panel of modules to recoil under heavy wave action and reset, thereby creating a force against the wave. This negating force works horizontally against the wave.

The present breakwater system also operates by means of buoyant interference. As such, the submerged breakwater system constructed in accordance with the present invention can diminish wave activity utilizing all of the foregoing methods with respect to the structural width determination. The system can be deployed parallel to a shoreline in several vertical panels, each spaced to achieve dissipation of a range of wave frequencies. This method of operation differs from the previous techniques in that the spacing of the vertical panels and buoyancy rather than the structural width is the determining factor in wave dissipation and, coupled with wave reflection and diffraction buoyancy, can double or triple the performance of the previous discussed embodiment.

The buoyant breakwater system can be deployed parallel to a shoreline in equidistant parallel vertical panels. The vertical panels are spaced equal to or less than half the wavelength of the desired wave frequency to attenuate the wave. Multiple vertical panels are deployed to cover certain wavelengths with overlapping coverage into other wavelengths. For example, to attenuate a five second wavelength, the vertical panels could be spaced fifty feet between vertical panels or any distance from zero to twenty feet from the first vertical panel of modules. Such spacing would provide overlapping coverage from one-second to five seconds, or, alternatively, adding an additional third vertical panel would provide additional overlap into the longer frequencies. The row spacing as with the width of the structures in the prior discussion makes the overall breakwater system tunable to a particular site's wave action and thus can be customized to a specific location and wave activity.

The degree of dissipation for a particular wave is also tunable based on the amount or volume of air trapped within the modules and certainly the number of vertical panels can be altered to increase dissipation with "structural flex". The more air that is contained within the structure, the greater the reactive force against the incoming waves. For example, if a user wanted only damaging storm waves to be eliminated by fifty percent, the number of buoyant vertical panels can be calculated that are required to perform that degree of dissipation and the vertical panels containing the appropriate number of panels constructed to the wavelength.

Buoyancy tuning and row spacing enable the present breakwater system to be out of phase with surrounding wave climate and the imbalance creates excellent wave dissipation.

Other features and advantages will become apparent to those skilled in the art from a review or the ensuing description which proceeds with reference to the following illustrative drawings.

DETAILED DESCRIPTION OF THE INVENTION

Figure 1:
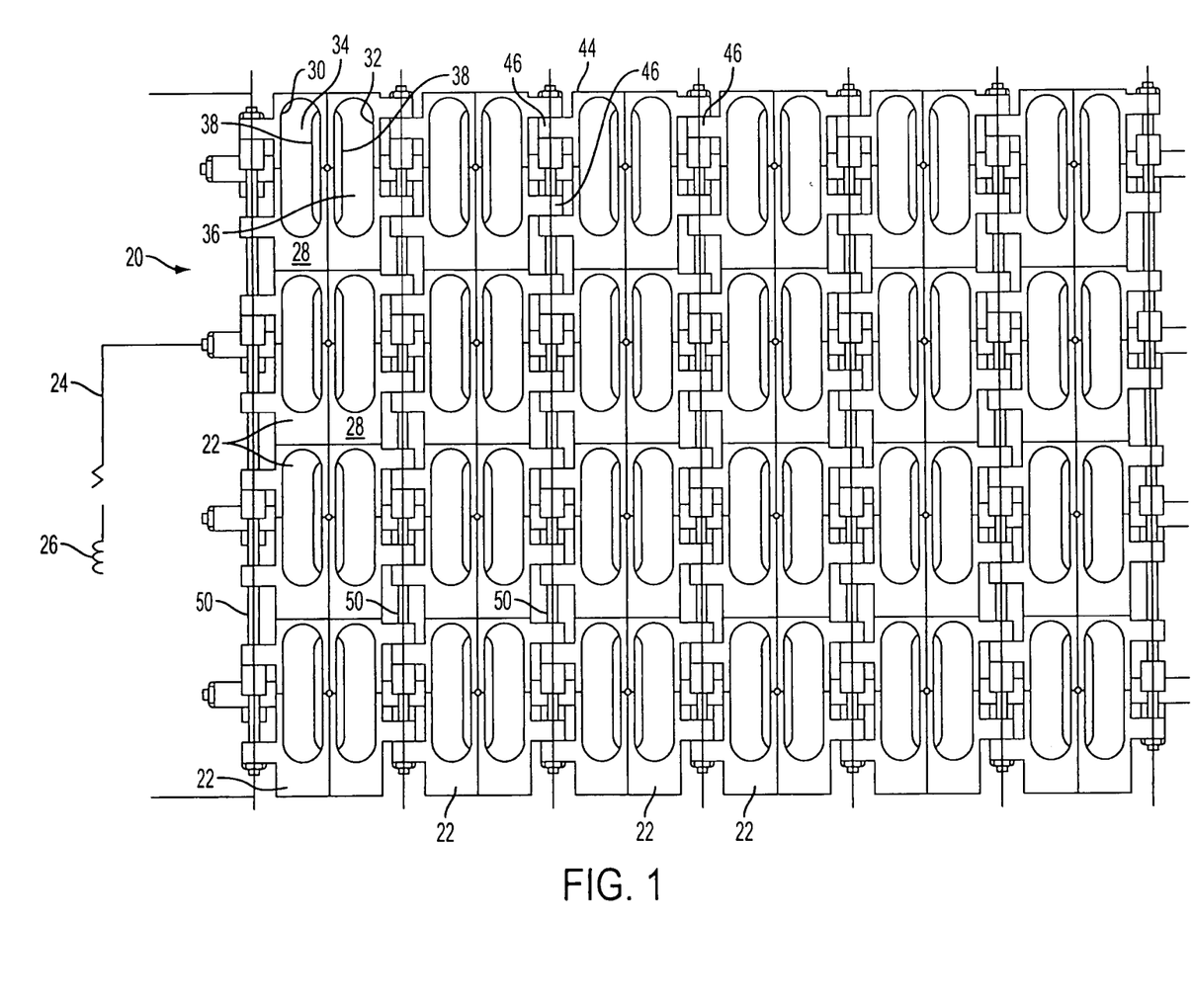
FIG. 1 shows a front elevational view of the floating breakwater system constructed in accordance with the present invention.
Figure 2:
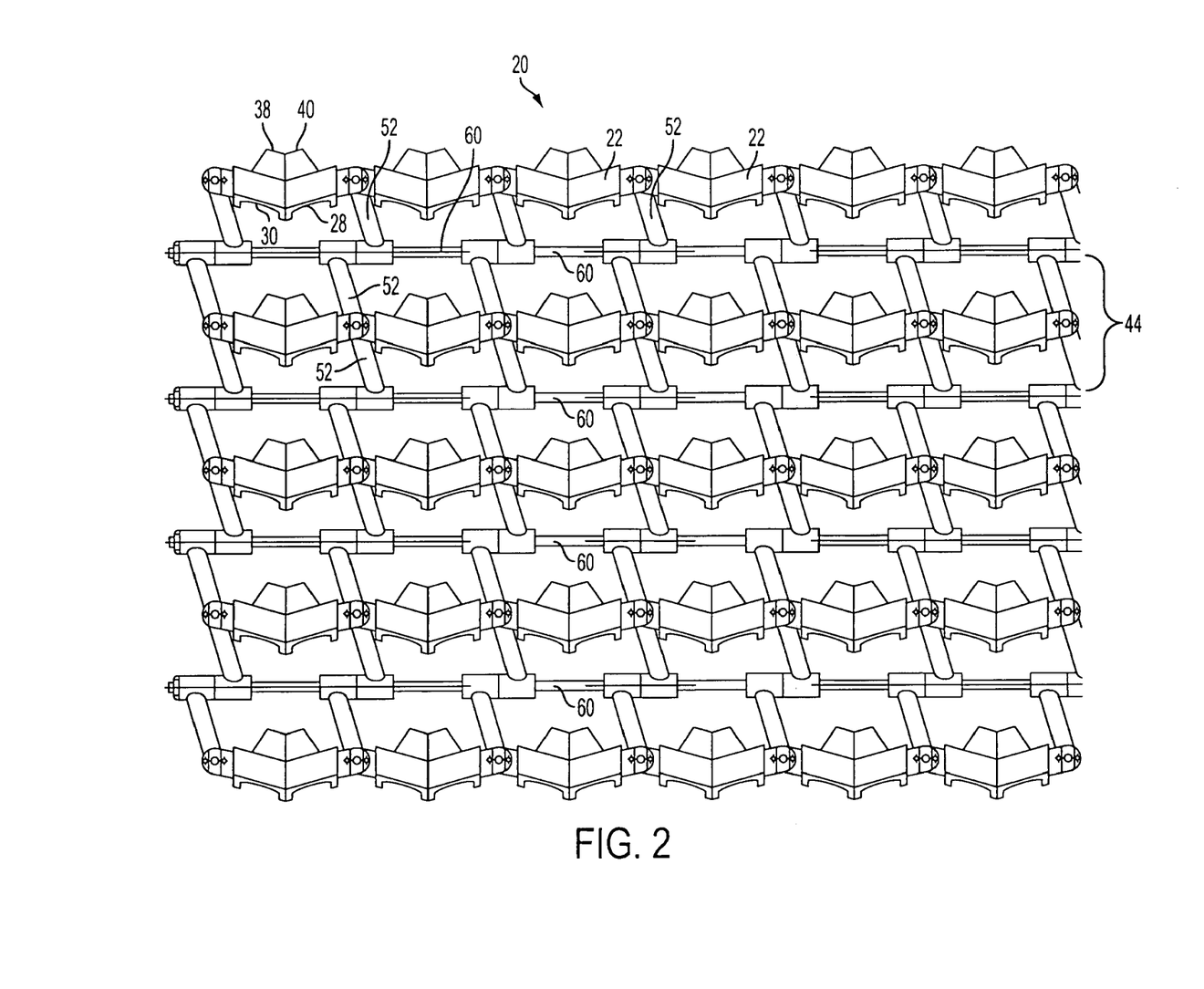
FIG. 2 is a top plan view of the system of FIG. 1.
Figure 3:
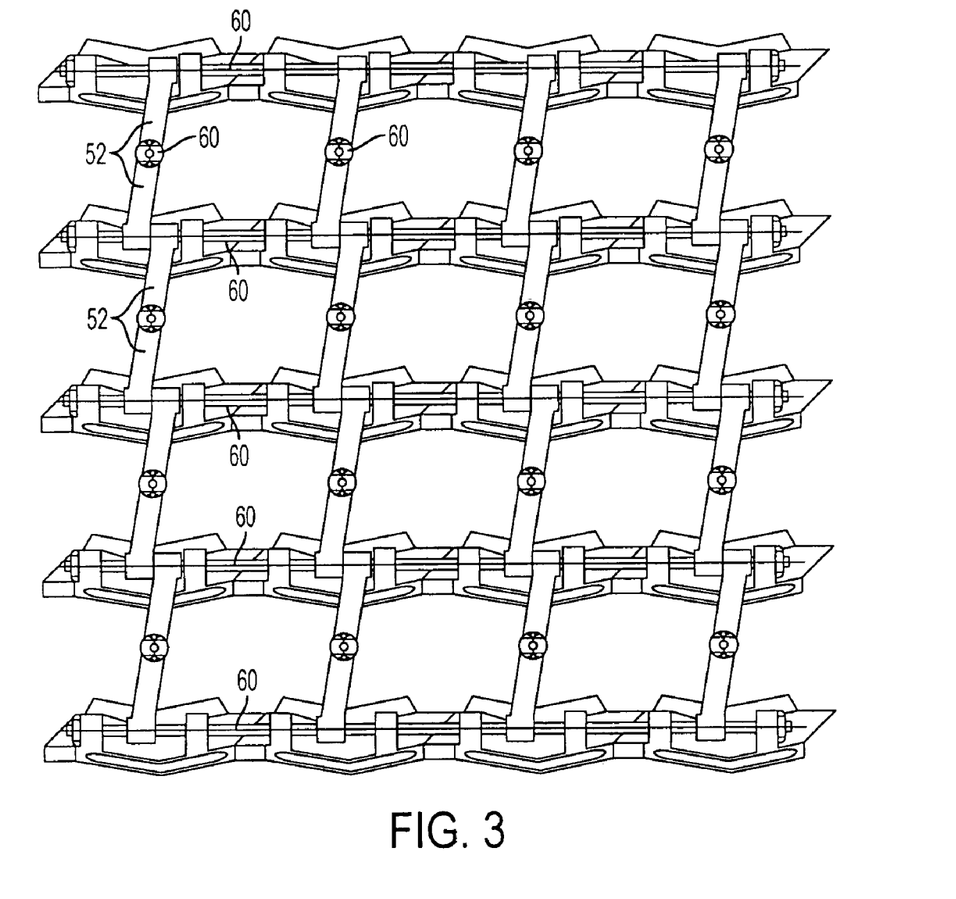
FIG. 3 is a side view of the system of FIG. 1.

Referring in particular to FIGS. 1-3, there is shown a floating breakwater system 20 constructed in accordance with the present invention.

As can be seen, the floatable breakwater system 20 preferably comprises a plurality of modules 22 that are assembled together in order to make up the overall system 20. The system itself is preferably anchored to the bed of the river or sea or the like with flexible cables 24 and anchored by anchor 26, shown schematically in FIG. 1, however, the anchoring of the present breakwater system can be carried out in a similar manner as the anchorage means shown and described in our U.S. Pat. No. 5,879,105. Such sea cables can be SEAFLEX® cables and which are specially adapted to have sufficient strength to bold the system 20 in position but with the necessary elasticity required to maintain the present breakwater system 20 to the bed of the ocean or other body of water. The anchors 26 are also preferably helical anchors that can provide sufficient stability to carry out the anchoring of the present system.

Turning specifically to FIG. 1, there is shown a front view of the overall breakwater system 20, i.e. showing the surface that is intended to be facing the oncoming wave or water motion. Hereafter, by definition, the front of the breakwater system 20 will be the surface that faces the oncoming wave and thus, the rear of the system 20 will be facing the direction that the wave is moving away from the system 20, after having passed through the breakwater system 20.

Accordingly, as can be seen by taking one of the modules as an example, all being similar, each module 22 has a front surface 28 that faces the oncoming wave and there are two inlets 30 and 32 formed in each module 22 that lead into passageways 34 and 36 and ultimately to two outlets 38 and 40 at the rear surface 42 of the modules 22. As will be described with respect to the preferred embodiment, there are two passageways formed in each module 22 for explaining the overall breakwater system, however, it can be readily seen that other passageways, in excess of two, can be used in carrying out the purposes of the present invention. In the preferred embodiment, both the inlets 30, 32 are oval shaped as are the outlets 38, 40 with the major axis of the oval configuration disposed in the vertical direction. Other geometric shapes of the inlets 30, 32 and outlets 38, 40 can, of course be used in carrying out the present invention.

Again, in the front view of FIG. 1, there are a plurality of the modules 22 affixed together in a generally vertical plane to form a vertical panel 44 of such modules 22. To carry out the affixation, each module 22 has a boss 46 that extends outwardly therefrom and each boss 46 has an opening therethrough. As shown, four of such bosses 46 are provided extending outwardly from each module 22 and are located so as to allow adjacent modules 22 to interfit together along the horizontal such that the holes in the bosses 46 of any one module 22 align with the holes in the bosses 46 of an adjacent module 22.

To carry out the affixation of the modules 22 to form a vertical panel 44, an elastic member, preferably a vertical rubber tube 50 can be threaded vertically through the holes in the abutting modules 22 so as to thread the modules together vertically and to also make a horizontal joint to enable the vertical panels 44 to be formed from a plurality of modules 22. Thus, the vertical panels 44 comprise a plurality of modules 22 that are flexibly affixed together and the overall vertical panel 44 can move, such as by flexing or bending, as the wave hits the vertical panel 44.

In FIG. 2, specifically, there is shown a top view of the system 20 where a plurality of vertical panels 44 are affixed together to form the floating breakwater system 20. In order to afford the flexibility needed to carry out the present system, the vertical panels 44 are spaced apart in order to provide space for the wave as it progresses from the initial vertical panel 44 to the subsequent vertical panels 44. In the preferred embodiment, there may be a space between any one vertical panel 44 and the next succeeding vertical panel 44 of about six feet and that spacing and affixation of the adjacent vertical panels 44 is accomplished by flexible connectors 52.

Figure 4A:
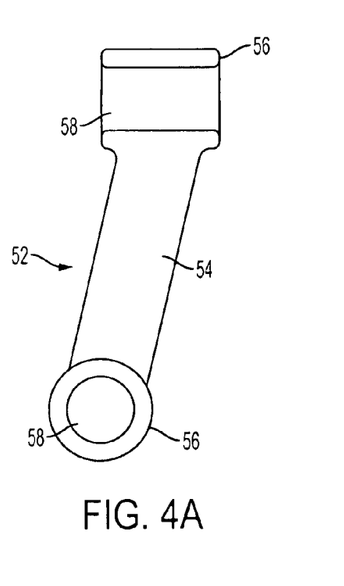
FIGS. 4A and 4B are, respectively a front and a side view of the flexible connector used with the present invention.
Figure 4B:
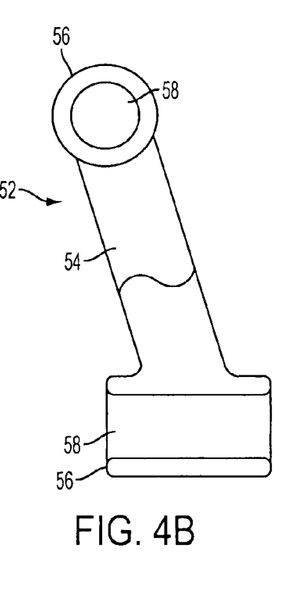

The flexible connectors 52 can be seen more specifically in FIGS. 4A and 4B showing a front and a side view, respectively, of a flexible connector 52 that is used with the present invention to flexibly join the vertical panels 44 together in a generally parallel planar configuration. The flexible connectors 52 are preferably comprised of a flexible material such as rubber and each flexible connector 52 includes a strut 54 having opposed ends 56 within which are formed holes 58. The holes 58 are formed so as to be rotated or displaced about 90 degrees with respect to each other. Referring to FIG. 2, the flexible connectors 52 are shown to be connecting the vertical panels 44 together. As such, one of the ends 56 of each flexible connector 52 receives a vertical rubber tube 50 while the other end of the flexible connector 52 also receives a horizontal rubber tubes 60 such that the flexible connectors 52 are affixed to a horizontal rubber tube 60 and a vertical rubber tube 50 and provide a flexible means of affixing together the vertical panels 44.

As indicated, the flexible affixation of the vertical panels 44 allows those vertical panels 44 to move quite freely under the influence of the wave and dissipates the wave energy as that wave progresses along the plurality of vertical panels 44.

Figure 5:
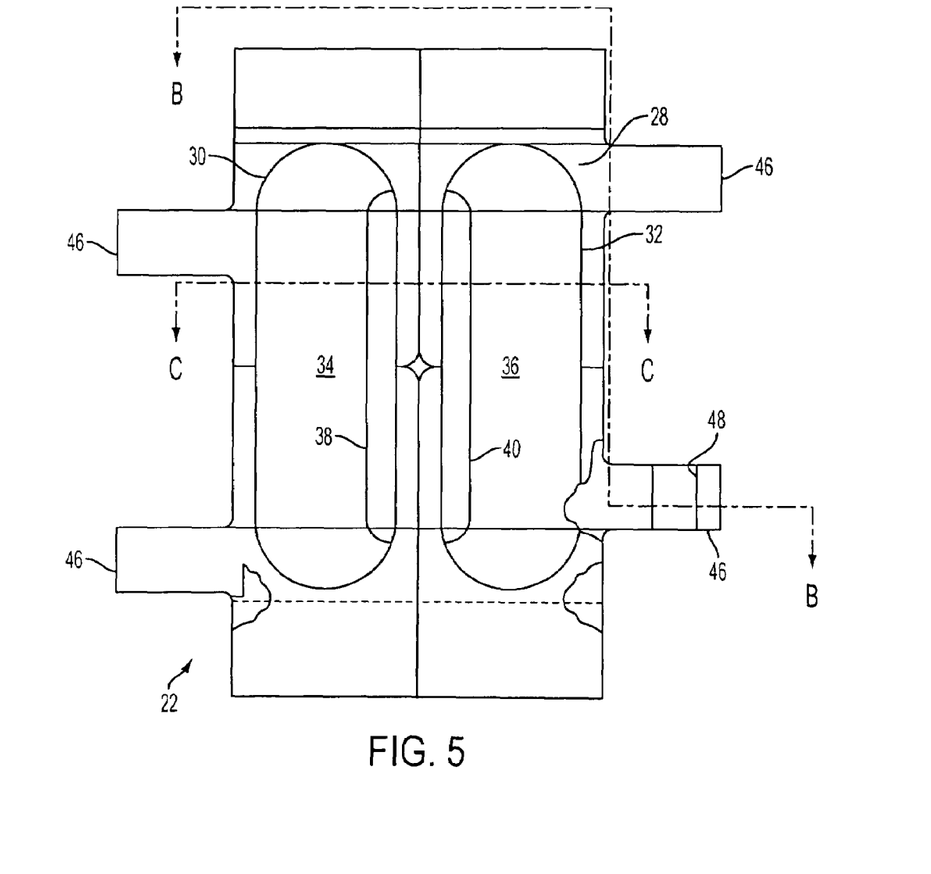
FIG. 5 is a front view of one of the individual modules used to construct the floatable breakwater system of the present invention.

Turning now to FIG. 5, there is shown a front view of one of the modules 22 and showing the front surface 28 having formed therein a pair of inlets 30, 32 to receive the water propelled by the water wave or other disturbance. The modules 22 are preferably formed of polyethylene and can be molded inexpensively to insure that the overall breakwater system 20, when completed is cost effective for its intended purpose, however, other buoyant materials could be used for construction of the modules 22. The polyethylene material can be treated so as to resist ultraviolet ("UV") deterioration.

As also can be seen from FIG. 5, the bosses 46 extend outwardly and have the holes 48 within which are positioned the vertical rubber tubes 50 (not shown in FIG. 5). The outlets 38 and 40 are positioned inwardly of the module 22 in carrying out the inward direction and ultimate convergence of the longitudinal center lines of the passageways 34, 36. As also can be noted, the cross sectional areas of the outlets 38, 40 are less than the cross sectional areas of the inlets 30, 32 thus illustrating the tapering or narrowing of the passageways 34, 36 to create the backing up of the water as it passes through the passageways 34, 36 from the inlets 30, 32 to the outlets 38, 40. As will be seen, in the preferred embodiment, the ratio of the area of the inlet to the outlet of each passageway is designed to be about 3 to 1.

Figure 6:
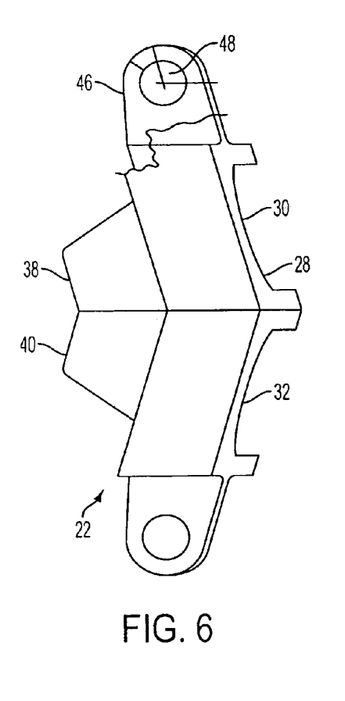
FIG. 6 is a cross sectional view of the module taken along the lines 6-6 of FIG. 5.

The detail of the bosses 46 can be better seen in FIG. 6 which is a cross sectional view taken along the lines 6-6 of FIG. 5.

Figure 7:
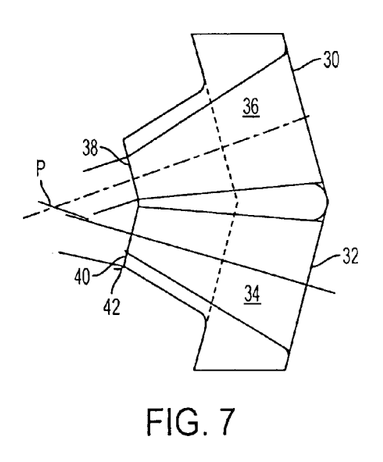
FIG. 7 is a further cross sectional view of the module taken along the lines 7-7 of FIG. 5.

Turning now to FIG. 7, there is shown a cross sectional view of the module 22 taken along the lines 7-7 of FIG. 5. In this Figure, there can be seen the tapering of the passageways 34, 36 in the direction of the flow of the water from a wave and also that the longitudinal center lines of those passageways converge toward each other and ultimately those center lines meet at a point P located downstream or displaced rearwardly of the outlets 38, 40. At the point P, therefore, the individual streams of water that pass through the passageways 34, 36 meet and converge upon each other, thereby causing the dissipation of the power of the wave or other surge of water and lead to the great effectiveness of the overall floating breakwater system 20.

As seen, those longitudinal center lines preferably converge toward each other at an angle of between about 40 degrees and 50 degrees, and more preferably at an angle of about 41 degrees, however, other angles may be utilized depending upon the particular wave conditions, it only being important that the two streams of water that pass through the passageways 34, 36 converge upon each other downstream of the outlets 38, 40 to cause the dissipation of the energy of the wave.

Figure 8:
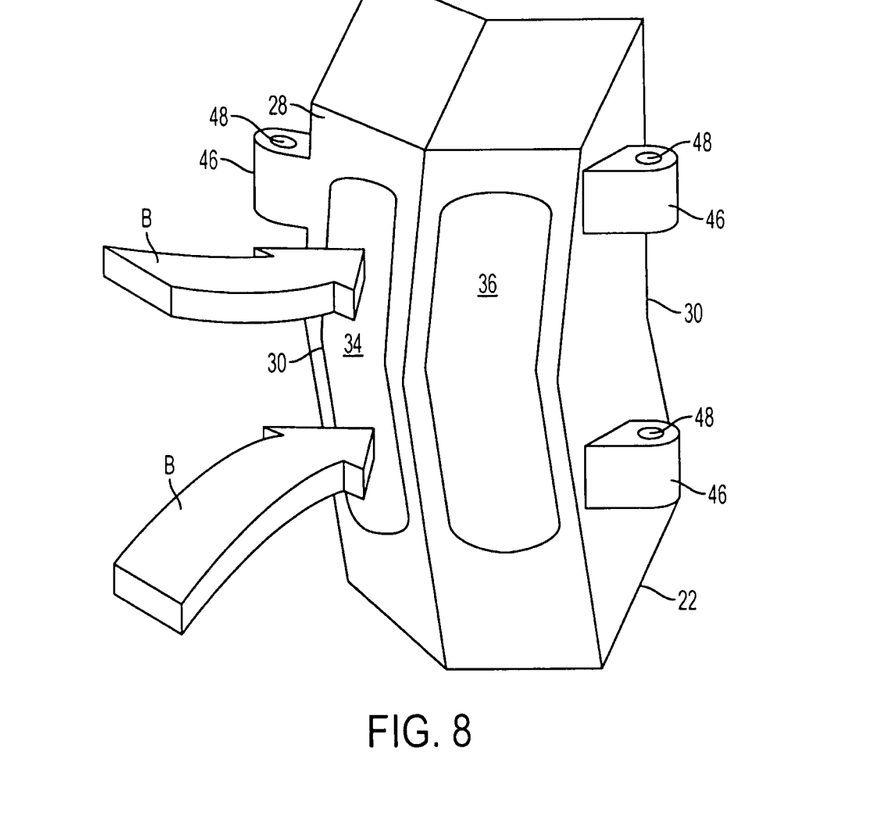
FIG. 8 is a perspective view of a module used in the present invention and looking toward the front surface showing the inlets.
Figure 9:
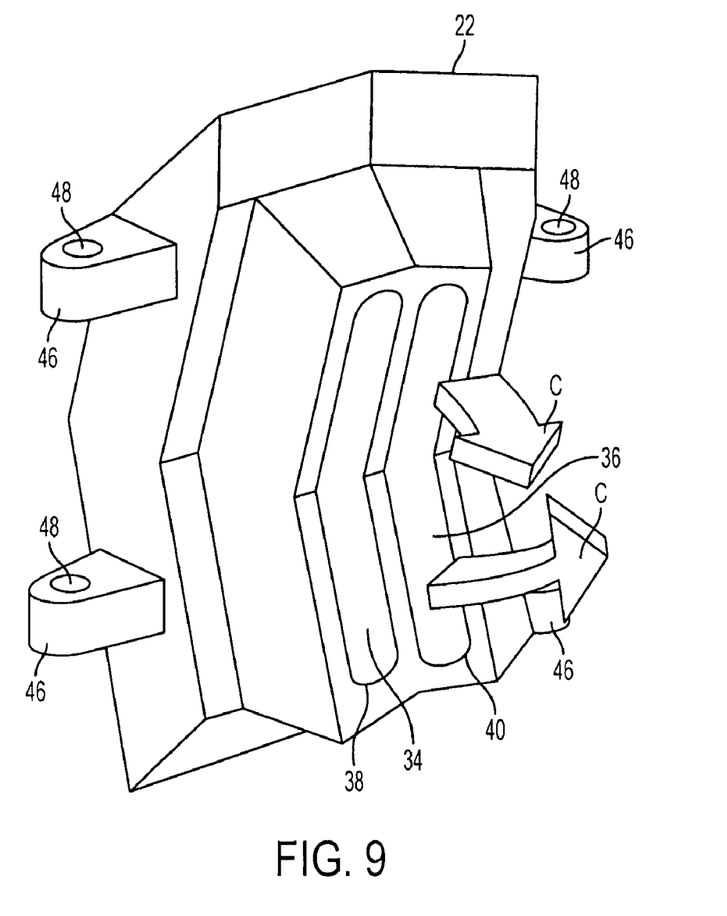
FIG. 9 is a perspective view of a module used in the present invention and looking toward the rear surface showing the outlets.
Figure 10:
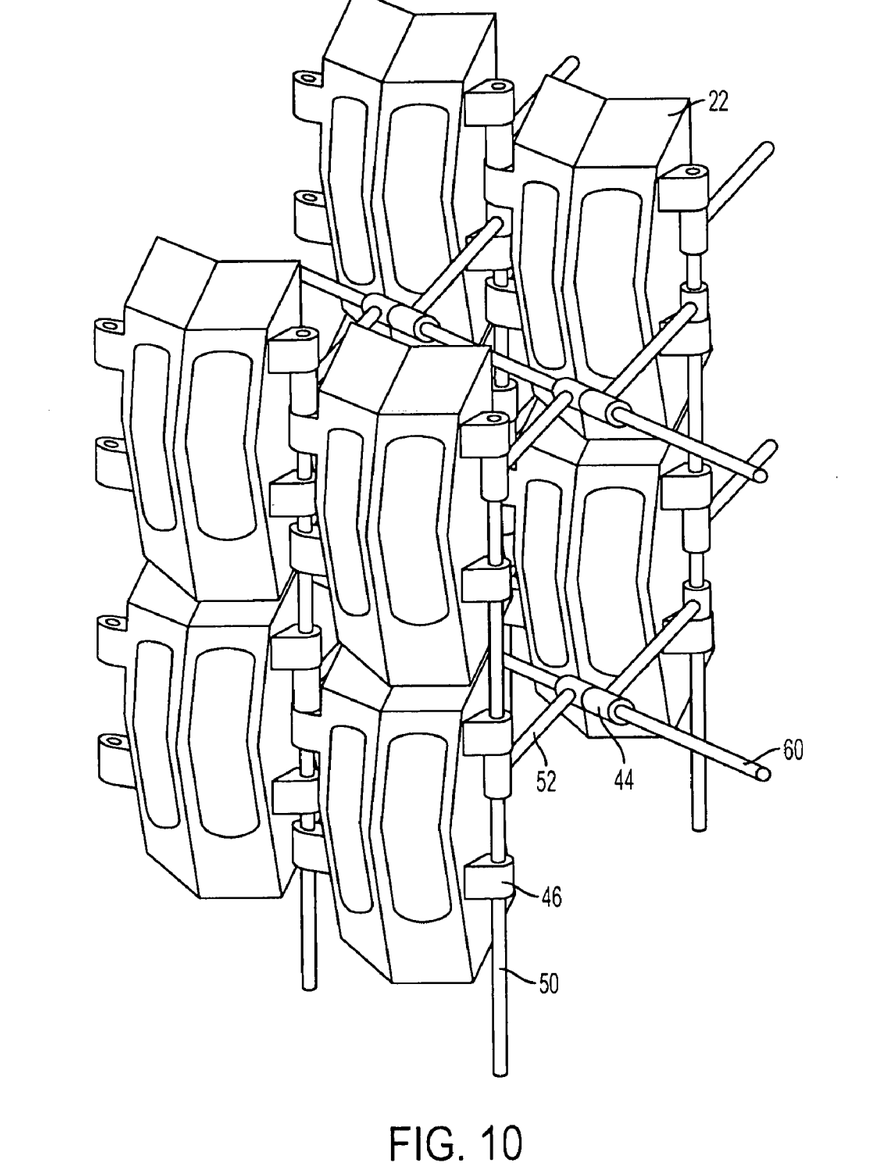
FIG. 10 is a perspective view of a portion of the present breakwater system of the present invention and showing two contiguous vertical panels.

Turning finally to FIGS. 8-10, there are shown perspective views, respectively, of the front surface 28 of a module 22, the rear surface 42 of a module 22 and a portion of a breakwater system 20 showing a plurality of vertical panels 44. Taking FIG. 8 first, there can be seen a pair of inlets 30, 32 that receive the water impelled by a wave in the direction depicted by the arrows B. Taking that Figure along with FIG. 9, there can also be seen, the outlets 38, 40 formed in the rear surface 42 of the module 22 with the passageways 36, 35 extending therebetween. The arrows C of FIG. 9 show the direction of the water coming from the outlets 38, 40 and, as stated, those streams of water from the outlets 38, 40 converge and come together at a point downstream or displaced rearwardly from the outlets 38, 40 to dissipate the energy of the wave. By contrasting the size or the inlets 30, 32 in FIG. 8 and the outlets 38, 40 in FIG. 9, the narrowing or tapering of the two passageways 34, 36 is made clear. As indicated, there is a preferred ratio of 3 to 1 of the area of the inlet to the area of the outlet for each passageway.

In FIGS. 8 and 9 it can also be seen that the bottom surface 64 of the module 22 has an angled surface, that is, there is a lower centered apex 66 in the bottom surface and the bottom angles upwardly at an angle of about 45 degrees on each side. The purpose of the angled bottom, is to allow the vertical upwelling of a wave to deflect the wave motion and create more spumes and vortices between the modules 22.

In FIG. 10, there can be seen a perspective view of a portion of a breakwater system having a plurality of vertical panels 44 and to illustrate that the vertical panels 44 are flexibly joined together by the flexible connectors 52 affixed to the vertical rubber tubes 50 to keep the vertical panels 44 the proper distance apart while allowing considerable flexibility between the vertical panels.

It will be understood that the embodiments described herein are merely exemplary and that a person skilled in the art may make many variations and modifications without departing from the spirit and scope of the invention. All such variations and modifications are intended to be included in the scope of the invention as described herein.

We claim:

1. A module for a breakwater system for dissipating the energy of a wave, said module comprising:
    a front surface facing the oncoming wave;
    a rear surface oppositely located with respect to said front surface; and
    a connecting surface connecting the front surface and the rear surface;
    at least two passageways formed in said module,
    each of said at least two passageways having an inlet in said front surface to receive the wave and an outlet in said rear surface to discharge the wave from said module,
    each of said at least two passageways being tapered inwardly in the direction from said inlet to said outlet, each of said passageways having a main longitudinal axis,
    said longitudinal axes of said at least two passageways being oriented so as to converge at a point displaced from said outlets such that the wave passing through said at least two passageways converge together after being discharged from said outlets wherein the wave energy is dissipated.

2. The module as defined in claim 1 wherein said at least two passageways comprise two passageways.

3. The module as defined in claim 2 wherein said longitudinal axes of said two passageways converge toward each other at an angle of from about 40 degrees to about 50 degrees.

4. The module as defined in claim 3 wherein said longitudinal axes of said two passageways converge toward each other at an angle of about 41 degrees.

5. The module as defined in claim 2 wherein said inlets and outlets have major axes disposed diagonally.

6. The module as defined in claim 5 wherein said passageways taper inwardly with an inlet to outlet ratio of about 3 to 1.

7. The module as defined in claim 2 wherein said bottom surface is a V-shaped configuration having a center apex and transition surfaces.

8. The module as defined in claim 7 wherein said transition surfaces extend upwardly from said apex at an angle of about 45 degrees.

9. A floatable breakwater system for dissipating the energy of a wave, said system comprising:
    at least two vertical panels formed of a plurality of individual modules;
    said modules being held in said vertical panels by vertical elastic members; and
    said at least two vertical panels being joined together by flexible connector means wherein each of said individual modules comprise:

a front surface facing the oncoming wave;
a rear surface oppositely located with respect to said front surface; and
a connecting surface connecting the front surface and the rear surface;
at least two passageways formed in said module,
each of said at least two passageways having
an inlet in said front surface to receive the wave and
an outlet in said rear surface to discharge the wave from said module,
each of said at least two passageways being tapered inwardly in the direction from said inlet to said outlet,
each of said passageways having a main longitudinal axis, and
said longitudinal axes of said at least two passageways being oriented so as to converge at a point displaced from said outlets such that the wave passing through said at least two passageways converge together after being discharged from said outlets wherein the wave energy is dissipated.

10. The floatable breakwater system for dissipating the energy of a wave as defined in claim 9 wherein said vertical elastic members comprise vertically oriented rubber tubes.

11. The floatable breakwater system for dissipating the energy of a wave as defined in claim 9 wherein said system further includes a horizontally disposed elastic member intermediate each of said vertical panels.

12. The floatable breakwater system for dissipating the energy of a wave as defined in claim 11 wherein said flexible connector means affixes said vertical panels to said horizontally disposed elastic members.

13. The floatable breakwater system for dissipating the energy of a wave as defined in claim 11 wherein said flexible connector means comprises a strut having opposed ends, each of said opposed ends having a hole therethrough, and wherein said flexible connector means is adapted to connect between said horizontally disposed elastic member and said vertical elastic member to provide flexibility between a vertical panel and the next succeeding vertical panel.

14. The floatable breakwater system for dissipating the energy of a wave as defined in claim 13 wherein said holes in said opposed ends are oriented at about 90 degrees with respect to each other and wherein one of said holes is adapted to receive said horizontally disposed elastic member and the other of said holes is adapted to receive said vertical elastic member.

15. The floatable breakwater system for dissipating the energy of a wave as defined in claim 14 wherein said connector means is made of rubber.

16. The floatable breakwater system for dissipating the energy of a wave as defined in claim wherein said horizontally disposed elastic members are rubber tubes.

17. The floatable breakwater system for dissipating the energy of a wave as defined in claim 9 wherein each of said individual modules has a bottom surface and wherein said bottom surface is generally V-shaped having a lower apex and transition surfaces.

18. The floatable breakwater system for dissipating the energy of a wave as defined in claim 17 wherein said transition surfaces extend upwardly from said apex at about a 45 degree angle with respect to the horizontal.

19. The floatable breakwater system for dissipating the energy of a wave as defined in claim 9 wherein said longitudinal axes converge toward each other and meet at an angle of between about 40 and 50 degrees.

20. The floatable breakwater system for dissipating the energy at a wave as defined in claim 19 therein said longitudinal axes converge toward each other at an angle of about 41 degrees.

21. A method of dissipating the energy of a wave traveling in a direction, said method comprising the steps of:
providing an apparatus comprising a plurality of individual modules, each module comprising:
a front surface;
a rear surface; and
a connecting surface connecting the front surface and the rear surface;
at least two passageways extending through the module,
each of said at least two passageways having an inlet in said front surface to receive the wave and an outlet in said rear surface to discharge the wave from said module;
wherein the passageways are tapered inwardly in the direction of the wave and which each of the passageways have a longitudinal axis converging to meet at a point displaced from the outlets;
positioning the apparatus such that the front surface of the modules receive the water propelled by the wave to allow the water to pass through the modules; and
causing the wave action to propel the water through the passageways so as to impinge upon each other to dissipate the energy of the wave.

22. A method of dissipating the energy of a wave traveling in a direction, said method comprising the steps of:
providing a floating breakwater system, said system comprising:
at least two vertical panels formed of a plurality of individual modules,
said modules being held in said vertical panels by vertical elastic members; and
said at least two vertical panels being joined together by flexible connector means wherein each of said individual modules comprise
a front surface facing the oncoming wave;
a rear surface oppositely located with respect to said front surface; and
a connecting surface connecting the front surface and the rear surface;
at least two passageways formed in said module,
each of said at least two passageways comprising
an inlet in said front surface to receive the wave and
an outlet in said rear surface to discharge the wave from said module,
each of said at least two passageways being tapered inwardly in the direction from said inlet to said outlet,
each of said passageways having a main longitudinal axis,
said longitudinal axis of said at least two passageways being oriented so as to converge at a point displaced from said outlets such that the wave passing through said at least two passageways converge together after being discharged from said outlets wherein the wave energy is dissipated;
positioning said floating breakwater such that the front surface of the modules receive the water propelled by the wave to allow the water to pass through the modules; and
causing the wave action to propel the water through the passageways so as to impinge upon each other to dissipate the energy of the wave.

* * * * *